(12) United States Patent
Katsaros

(10) Patent No.: US 10,859,119 B2
(45) Date of Patent: Dec. 8, 2020

(54) BEARING ASSEMBLY WITH PRELOAD

(71) Applicant: Aktiebolaget SKF, Gothenburg (SE)

(72) Inventor: Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 560 days.

(21) Appl. No.: 15/328,774

(22) PCT Filed: Jul. 24, 2015

(86) PCT No.: PCT/EP2015/066966
§ 371 (c)(1),
(2) Date: Jan. 24, 2017

(87) PCT Pub. No.: WO2016/016110
PCT Pub. Date: Feb. 4, 2016

(65) Prior Publication Data
US 2017/0211625 A1 Jul. 27, 2017

(30) Foreign Application Priority Data
Jul. 30, 2014 (DE) .................. 10 2014 214 999

(51) Int. Cl.
*F16C 33/60* (2006.01)
*F16C 19/38* (2006.01)
(Continued)

(52) U.S. Cl.
CPC .......... *F16C 33/605* (2013.01); *F16C 19/386* (2013.01); *F16C 25/06* (2013.01);
(Continued)

(58) Field of Classification Search
CPC ...... F16C 33/605; F16C 19/386; F16C 25/06; F16C 43/06; F16C 2226/12; F16C 2229/00
See application file for complete search history.

(56) References Cited

U.S. PATENT DOCUMENTS 3,937,539 A * 2/1976 Jones .................... F16C 33/581
384/571
2003/0236148 A1 12/2003 Fox
(Continued)

FOREIGN PATENT DOCUMENTS

DE 102012221297 A1 5/2014
JP 2006342830 A 12/2006

*Primary Examiner* — David P Bryant
*Assistant Examiner* — Nirvana Deonauth
(74) *Attorney, Agent, or Firm* — J-Tek Law PLLC; Scott T. Wakeman; Mark A. Ussai

(57) ABSTRACT

A preloaded bearing assembly includes two tapered roller bearings that each have an inner ring and an outer ring and rolling elements therebetween, wherein both bearings are preloadable with a predetermined preload force by relatively shifting the inner rings and/or the outer rings in an axial direction. Flanges are disposed on the inner rings and/or the outer rings and form an axial stop for the rolling elements, and at least one of the flanges is adjustable on or relative to the associated bearing ring in the axial direction. The axially adjustable flange is disposed with a predetermined press-fit on or relative to the bearing ring and is shiftable on or relative to the bearing ring against a frictional force provided by the predetermined press-fit, and the predetermined preload force is determined by a magnitude of the frictional force of the predetermined press-fit.

19 Claims, 3 Drawing Sheets

(51) Int. Cl.
*F16C 25/06* (2006.01)
*F16C 43/06* (2006.01)
(52) U.S. Cl.
CPC .......... *F16C 43/06* (2013.01); *F16C 2226/12* (2013.01); *F16C 2229/00* (2013.01)

(56) References Cited

U.S. PATENT DOCUMENTS

2005/0063629 A1* 3/2005 Fahrni, Jr. ............... F16C 25/06
384/583
2015/0043858 A1* 2/2015 Aust .................... F16C 19/543
384/558

* cited by examiner

BEARING ASSEMBLY WITH PRELOAD

CROSS-REFERENCE

This application is the U.S. National Stage of International Application No. PCT/EP2015/066966 filed on Jul. 24, 2015, which claims priority to German patent application no. 10 2014 214 999.1 filed on Jul. 30, 2014.

TECHNOLOGICAL FIELD

The present disclosure is directed to a preloadable bearing assembly having at least one adjustable flange, as well as to a method for adjusting a preload of such a bearing assembly.

BACKGROUND

Bearing assemblies of the above-mentioned type are often embodied as tapered-roller-bearing assemblies. Here two cooperating tapered roller bearings are axially preloaded against each other. The adjusting of the preload in tapered roller bearings here is a relatively complicated and also imprecise process. The correct preload is attempted to be set by shifting the two inner rings of a tapered-roller-bearing unit axially toward each other (in the case of a back-to-back bearing arrangement) or axially away from each other (in the case of a face-to-face bearing arrangement). The correct displacement path is determined by a complex measuring of the components and set by shims such that the desired preload arises, and namely after tightening of a shaft nut with which the entire bearing assembly is fixed to a shaft part.

Since the securing of the nut or the fixing of the inner rings is achieved via a corresponding clamping force, it mast be taken into account here in turn that the bearing preload complexly set via shims is influenced by the usually very large clamping force. An exact desired preload can thus only be achieved with difficulty.

It has therefore been proposed in the prior art, in particular DE 10 2012 221 297, to dispose at least one of the flanges on the bearing ring such that it is adjustable in the axial direction relative to the bearing ring carrying it, wherein the adjustable flange includes a thread via which its axial position is adjustable.

However, a disadvantage of this prior art is that the screwing-in of a thread in the bore and the bearing ring is very cumbersome and must be very precisely performed. Furthermore, the adjusting of the preload via the unscrewing of the flange is time-intensive and requires precise work for the providing of a defined preload.

SUMMARY

The object of the present invention is therefore to provide a bearing assembly or a method by which the preload of the bearing assembly can be simply and precisely adjusted.

According to the invention a bearing assembly is provided including two rolling-element bearings, in particular tapered roller bearings, which each comprise two bearing rings that are configured as inner ring and outer ring, wherein rolling elements are disposed between the bearing rings. Here both rolling elements are preloadable by a relative displacement in the axial direction of the inner- and/or outer-rings. Flanges are also disposed on the inner rings and/or the outer rings, which flanges form an axial stop for the rolling elements. Here at least one of the flanges is configured adjustable in the axial direction relative to the bearing ring carrying it and disposed on and/or relative to the bearing ring. In order to now achieve a simple installation of these axially displaceable flanges a thread is not provided as in the prior art; rather the at least one axially adjustable flange is disposed with press-fit on or relative to the bearing ring and configured displaceable on or relative to the bearing ring against a friction provided by the press-fit.

A simple adjusting of the preload is advantageously achieved by the inventive design of the bearing assembly via the size of the frictional force with the axial displacing of the flange. A separation of the two preload circuits, namely of the preload circuit of the roller preload and the preload circuit of the inner-ring clamping, can thereby be achieved, which in turn causes the negative influence of an inner-ring clamping or a nut-locking to be able to be separated from the actual bearing preload. In addition, via the press-fit or the magnitude of the friction generated by the press-fit when displacing the flange it can be precisely determined what force the rolling elements exert on the flange and thus what preload prevails in the bearing assembly. A defined preload on the bearing assembly can thereby be simply and quickly achieved. Here it is also possible to achieve different preloads via the use of different press-fits of the flange.

Furthermore, a great variant diversity of the arrangement possibilities of the flange is advantageously achieved. Thus, for example, the flange can be disposed on the outer ring or inner ring or also on a bearing housing receiving the rolling-element bearing or a shaft rotatably supported by the bearing.

According to a further advantageous exemplary embodiment the inner ring or outer ring includes a cylindrical seat surface onto which the adjustable flange is pushable-on under press-fit. Due to the cylindrical seat surface it can be achieved that a constant frictional force counters the displaceability of the bearing flange and thus a defined preload can be determined and generated.

Furthermore it is advantageous if the adjustable flange is axially non-adjustably fixable on the bearing ring. If the desired preload is generated then the bearing flange can be axially secured in order to prevent a slipping of the flange during operation of the bearing.

Here the flange can be connected in an interference-fit or materially-bonded manner, in particular by welding, to the bearing ring and/or the bearing housing. Due to the interference-fit or materially-bonded connection the flange can be very quickly and reliably connected to the bearing ring or the bearing housing. Here a preferentially circumferentially disposed groove can also be provided on the bearing ring and/or the bearing housing, into which groove the flange is rolled into and/or to which the flange is connected with interference-fit in another manner.

If the flange is also configured slightly deformable at least in a partial region, in particular the region that interacts with the groove, then the flange in the region of the groove can be deformed, for example, by hammering, whereby an interference fit arises.

According to a further advantageous exemplary embodiment the adjustable flange is configured hardened at least in part, in particular inductively hardened, wherein preferably an axial end region facing the rolling elements is configured hardened and an axial end region facing away from the rolling elements not hardened. As already mentioned above, this makes possible a simple interference-fit connection between the flange and the bearing ring and/or the bearing housing. Since the flange should preferably have a hard contact region for the rolling guiding as well as a plastically deformable region for the fixing of the flange on the bearing ring by plastic deforming, an inductively hardened contact zone is favored in particular. A plastic deforming can thereby be provided for an interference fit with the groove.

Alternatively or additionally, the adjustable flange at least partially includes, in particular on a surface, a wear-resistant coating. Here the axial end region facing the rolling elements preferably includes the wear-resistant coating. Furthermore it is preferred that in particular the region in contact with the rolling elements in particular has a wear-resistant coating. The wear-resistant coating can be, for example, a DLC (diamond-like carbon) layer, carbonitriding- and/or nitriding layer, but a ceramic layer, a hard-chromium layer, or another wear-resistance-promoting layer known in the prior art is also conceivable. Due to the wear-resistant coating the adjustable flange, in particular in the region in contact with the rolling elements, is particularly wear-resistant. Thus particularly with long operating periods premature appearances of wear in the contact region can be avoided, whereby the service life of the bearing can be extended.

A further aspect of the present invention relates to a method for setting a preload in a rolling-element bearing, in particular a tapered roller bearing, wherein the rolling-element bearing includes two bearing rings that are configured as inner ring and outer ring, and at least one rolling element is disposed between them. Furthermore an axially adjustable flange is disposed on the inner ring and/or the outer ring, wherein the axially adjustable flange is disposed with a press-fit on or relative to the bearing ring and is displaceable on or relative to the bearing ring against a friction provided by the press-fit. Here the method comprises the following steps:
a) Disposing a flange sleeve forming the adjustable flange on or relative to the bearing ring;
b) Disposing the at least one rolling element on the inner ring;
c) Inserting the inner ring including the at least one rolling element disposed therein in the outer ring;
d) Displacing of the inner ring and/or of the outer ring with respect to each other up to the stop of the at least one rolling element on the flange sleeve;
e) Displacing of the flange sleeve, against the friction provided by the press-fit, on or relative to the bearing ring by further displacing of the inner ring and/or of the outer ring so that a predetermined preload is achieved in the tapered roller bearing; and
f) Fixing of the guide sleeve in the position that the guide sleeve has assumed in achieving the predetermined preload.

Here it is preferred in particular if this method is used for preloading an above-described bearing assembly.

Further advantages and advantageous embodiments are to be learned from the description, the drawings, and the claims.

In the following the invention shall be described in more detail with reference to the exemplary embodiments depicted in the drawings. Here the exemplary embodiments are of a purely exemplary nature and are not intended to establish the scope of the application. This scope is defined solely by the pending claims.

DETAILED DESCRIPTION

In the following, identical or functionally equivalent elements are designated by the same reference numbers.

Figure 1:
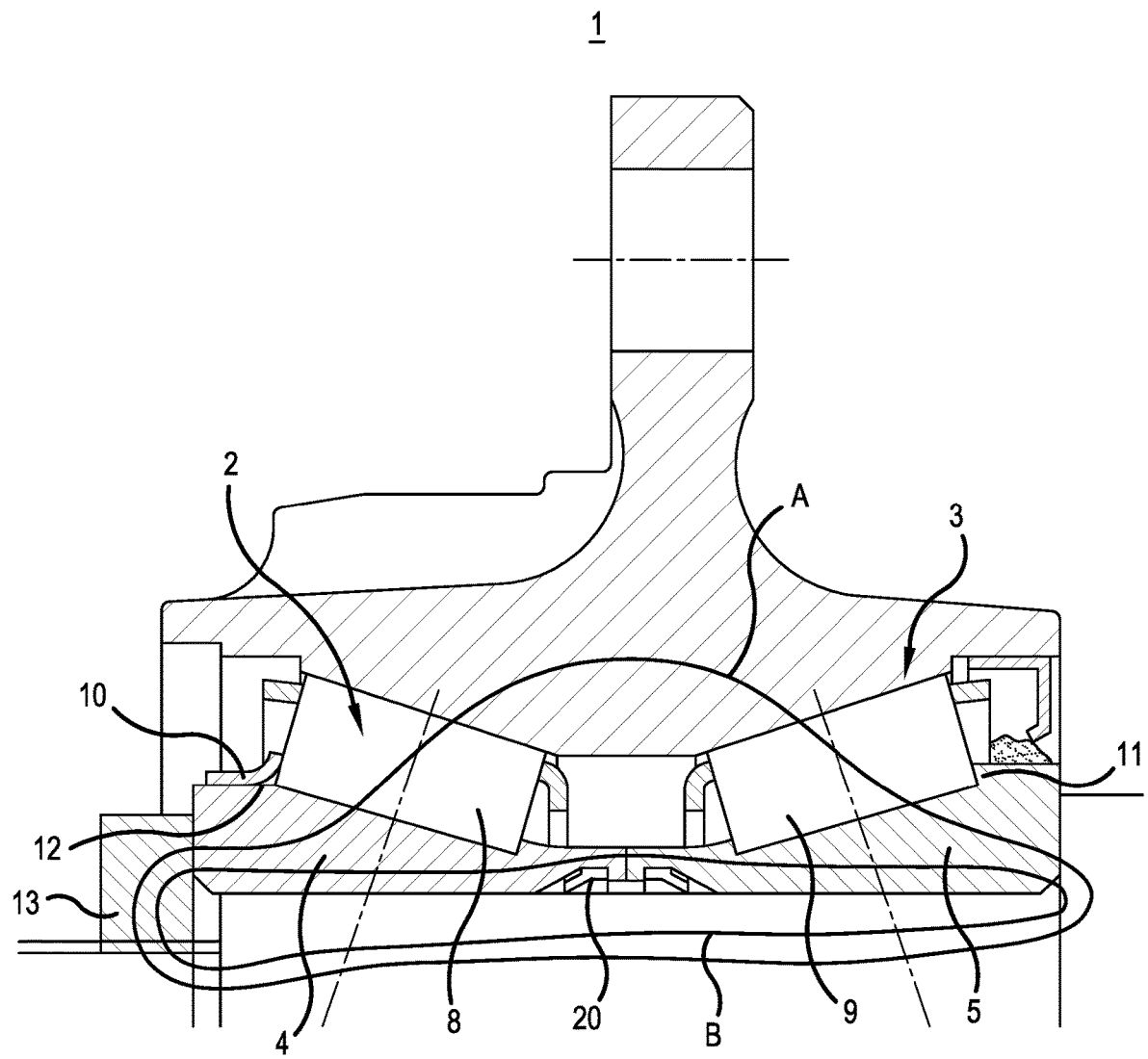
FIG. 1 shows a schematic sectional view through a first exemplary embodiment of the inventive bearing assembly.

In FIG. 1 a bearing assembly 1 is depicted that includes two tapered roller bearings 2 and 3. The two tapered roller bearings 2, 3 each have an inner ring 4 or 5, but a common outer ring 6. Rolling elements 8 or 9 are disposed between the bearing rings. Such bearing assemblies can be found in particular in wheel-bearing units, wherein the bearing assembly is fitted in a wheel hub.

The bearing assembly depicted is embodied in back-to-back arrangement. Flanges 10 and 11 on the inner rings 4, 5 limit the movability of the tapered rollers 8, 9 in the axial direction.

While the flange 11 of the inner ring 5 is classically formed onto the inner ring 5 as a fixed flange, this does not apply for the flange 10 on the inner ring 4. This flange is embodied as an axially adjustable flange, i.e., it can be adjusted on the inner ring 4 in the axial direction.

Figure 2:
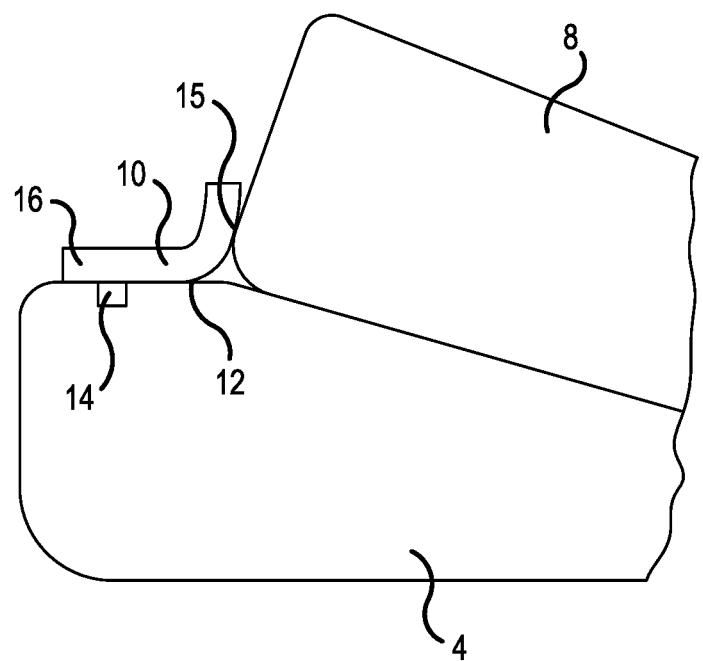
FIG. 2 shows a detail view of the bearing assembly depicted in FIG. 1.

For this purpose the flange 10 is configured as a flange sleeve, as depicted in particular in the enlarged representation from FIG. 2, is configured with press-fit to the inner ring 4. Here it is particularly advantageous when, as FIG. 1 and FIG. 2 show, the inner ring 4 includes a cylindrical shoulder 12 onto which the flange 10 can be pushed-on under press-fit. Here during installation the flange sleeve 10 is shifted against the resistance of the friction so that a predetermined preload results.

The shifting of the flange 10 advantageously occurs here during installation, i.e., while the shaft nut 13 is tightened, in order to fix the inner rings 4 and 5 to each other. During the tightening of the shaft nut 13, the rolling elements 8, 9 are pressed-on on the outer ring via the inner rings 4, 5. Since the press-fit of the flange sleeve 10 is usually less than the force by which the shaft nut 13 shifts the inner rings 4, 5 into their end position, i.e., abutting each other, the flange sleeve 10 is shifted axially outward along the cylindrical shoulder 12. However, this shifting only occurs after overcoming of the counterforce generated by the friction, with the result that a preload is generated that is on the scale of the friction force. A predetermined preload can thereby be defined and determined.

At the same time the two preloads, namely the preload of the bearing assembly corresponding to the preload circuit A and the preload or clamping of the inner rings 4, 5 corresponding to the preload circuit B, are separated from each other by the positioning of the shaft nut 13, so that even with a later non-exact installation of the inner rings 4, 5 with respect to each other the predefined preload in the tapered roller bearing 1 itself remains.

If after the setting of the shaft nut 13 in its end position the flange sleeve is positioned on the cylindrical bearing seat 12, the position of the flange 10 can advantageously be fixed axially, for example, using an interference-fit connection or a materially-bonded connection. It is thereby ensured that even in operation an axially-farther shifting or loosening of the flange sleeve 10 does not take place. For this purpose, as depicted in FIG. 2, for example, a groove 14 can be incorporated on the inner ring 4, which groove 14 preferably extends circumferentially around the bearing ring 4. After achieving of the predetermined preload, the flange sleeve 10 can then be rolled into the groove 14 or, for example, deformed by hammer blows such that a jamming of the flange sleeve 10 in the groove 14 occurs.

Here it is advantageous in particular if an axial end region 15 of the flange 10 facing the rolling elements 8 is configured induction-hardened. In contrast, an axial end region that is facing away from the rolling elements is not configured hardened. The non-hardened region 16 of the flange sleeve 10 can thereby be plastically deformed so that the material packed into the groove 14 ensures an axial securing of the flange sleeve 10 on the inner ring 4.

Alternatively or additionally it is possible to configure the axial end region 15 of the adjustable flange 10, which axial end region faces the rolling elements 8, with a wear-resistant coating. Due to this coating even with long operating periods premature appearances of wear in a contact region between the adjustable flange 10 and the rolling elements 8 can be avoided.

Alternatively it is of course also possible to attach the flange sleeve 10 to the inner ring 4 in a materially-bonded manner, for example, by welding. The forming of the groove 14 can then be omitted.

Instead of disposing the flange sleeve 10 on the inner ring 4, as depicted in FIGS. 1 and 2, it is of course also possible to place the flange sleeve 10 on the outer ring or on a bearing housing comprising the outer ring. A corresponding exemplary embodiment is depicted in FIG. 3.

Figure 3:
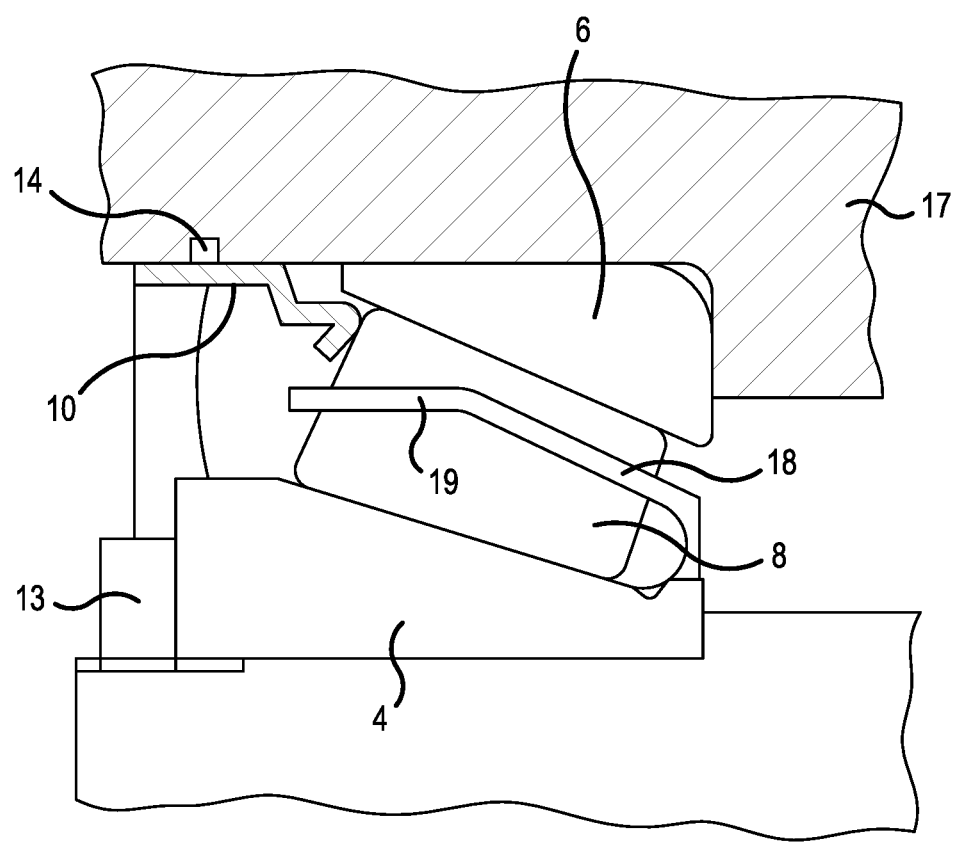
FIG. 3 shows a detail sectional view through a second preferred exemplary embodiment of the inventive bearing assembly.

FIG. 3 in turn shows a rolling-element bearing 2 including an inner ring 4 and an outer ring 6, wherein in the depicted exemplary embodiment the outer ring is received by a bearing housing 17. In this exemplary embodiment the flange sleeve forming the axially shiftable flange is disposed under press-fit in the bearing housing 17 and thus relative to the outer ring 6, however, it supports the rolling elements 8 and applies the desired preload thereto. Here it is noted in particular that the flange sleeve 10 can also be disposed on the outer ring 6 in press-fit and can be fixed there.

Also in this exemplary embodiment the position of the inner ring 4 relative to the outer ring 6 is set via a shaft nut 13. In an analogous manner to the exemplary embodiment depicted in FIGS. 1 and 2, with adjusting of the shaft nut 13 a shifting of the flange sleeve 10 occurs as soon as a frictional force of the flange sleeve 10 on the bearing housing 17, which frictional force is caused by the press-fit, is overcome. If the flange sleeve 10 is shifted to its final position, wherein at the same time the tapered roller bearing overall obtains the defined preload, the flange sleeve 10 can in turn be disposed axially unshiftable on the bearing housing 17 or the outer ring 6. For this purpose a groove 14 can in turn be provided, into which the material of the flange sleeve 10 is pressable-in. Alternatively a laser welding can also be used here.

As can further be seen in FIG. 3, in addition the rolling element 8 can be received in a cage 18, wherein if necessary the cage 18 can have a special design in order to provide space for the flange sleeve 10. Therefore in the exemplary embodiment depicted in FIG. 3 the cage 18 is configured angled at its larger diameter in a region 19 or extends parallel to an axis of rotation of the bearing. Other designs are of course also possible.

Such a transformation of the bearing cage 18 can but need not be necessary. Thus, for example, in FIGS. 1 and 2 no further requirement is placed on the bearing cage 18.

As already mentioned above the inventive bearing assemblies are advantageous in particular in wheel bearing units wherein the tapered roller bearings are installed under a determined preload. Simultaneously the inner rings 4 and 5 must usually generally be brought into a tightly abutting position in order to dispose a clip ring 20 (see FIG. 1) between them and axially secure the two inner rings 4 and 5 with respect to each other in operation. In particular in the solutions with adjusting rings known from the prior art this has led to the problem that in the assembly, precisely defined positions of the shaft nut are necessary in order to generate a defined preload. However, since this is very complicated in terms of assembly, to date a predetermined preload has usually been omitted.

Furthermore it is noted that the inventive method is also usable for other rolling-element bearings wherein a defined preload must be generated in the rolling-element bearing. Due to the axially adjustable flange 10, which is disposed in press-fit on one of the bearing rings 4, 6 or relative to one of the bearing rings 4, 6, and is shifted against the press-fit or against the friction generated by the press-fit, a determining of the preload can also be carried out by a determining of the frictional force. If the flange sleeve 10 is in its corresponding position, with a subsequent axial fixing of the flange sleeve 10 in this position the preload can be reproducibly set.

Furthermore it is advantageous that the preload can be set larger or smaller depending on how strong the press-fit is configured of the flange sleeve 10 on or relative to the bearing ring 4, 6.

Overall, using the inventive bearing assembly or the inventive method a bearing assembly can be provided that has a predetermined preload. At the same time this preload can be simply realized established.

REFERENCE NUMBER LIST

1 Bearing assembly
2 Rolling-element bearing
3 Rolling-element bearing
4 Inner ring
5 Inner ring
6 Outer ring
7 Outer ring
8 Rolling element
9 Rolling element
10 Adjustable flange
11 Fixed flange
12 Cylindrical seat surface
13 Shaft nut
14 Groove
15 Hardened axial end region
16 Non-hardened axial end region
18 Cage
19 Angled region of the cage
20 Clip ring
A Preload circuit
B Preload circuit

The invention claimed is:

1. A method of forming a preloaded tapered roller bearing assembly comprising:
providing a first tapered roller bearing and a second tapered roller bearing, each of the first and second tapered roller bearings comprising a first bearing ring and a plurality of tapered roller elements;
mounting an adjustable flange on the first bearing ring of the first tapered roller bearing or on a housing supporting the first bearing ring of the first tapered roller bearing against axial ends of the plurality of roller elements of the first tapered roller bearing with a predetermined press-fit such that a predetermined frictional force is required to slide the adjustable flange relative to the first bearing ring or the housing supporting the first bearing ring;

preloading the tapered roller bearing assembly with a predetermined preload force by pressing the first bearing ring of the first tapered bearing against the first bearing ring of the second tapered bearing, the pressing causing the adjustable flange to slide from a first axial position to a second axial position on the first bearing ring or on the housing while maintaining the predetermined press-fit, a frictional force of the predetermined press-fit creating the predetermined preload on the roller bearing assembly; and deforming the adjustable flange to fix the adjustable flange to the first bearing ring or to the housing in the ending position to maintain the predetermined preload.

2. The method according to claim 1 wherein the first bearing ring is an inner bearing ring.

3. The method according to claim 1, wherein the first bearing ring or the housing includes a groove and wherein deforming the adjustable flange comprises pressing a portion of the adjustable flange into the groove.

4. The method according to claim 1, wherein the adjustable flange is mounted on the housing.

5. The method according to claim 1, wherein the adjustable flange is mounted on an outer cylindrical surface of the first bearing ring and wherein the outer cylindrical surface and the adjustable flange are configured such that the adjustable flange is slidable linearly and axially along the cylindrical surface.

6. The method according to claim 1 wherein causing the adjustable flange to slide from the first axial position to the second axial position on the first bearing ring or on the housing comprises sliding the adjustable flange linearly and axially from the first axial position to the second axial position.

7. The method according to claim 1 wherein deforming the adjustable flange comprises creating an interference fit between the adjustable flange and the housing or between the adjustable flange and the first bearing ring.

8. The method according to claim 1 wherein the first bearing ring of the first tapered roller bearing is different from the first bearing ring of the second tapered roller bearing.

9. The method according to claim 1, wherein the adjustable flange includes an axial end in contact with the axial ends of the plurality of roller elements and wherein the method includes hardening the axial end of the adjustable flange.

10. The method according to claim 1, wherein the adjustable flange includes an axial end in contact with the axial ends of the plurality of roller elements and having a wear-resistant coating.

11. A method of forming a preloaded tapered roller bearing assembly comprising:

providing a first tapered roller bearing having a first inner ring and a first plurality of roller elements on the first inner ring and a second tapered roller bearing having a second inner ring different from the first inner ring and having a second plurality of roller elements on the second inner ring;

mounting an adjustable flange on the first bearing ring of the first tapered roller bearing or on a housing supporting the first bearing ring of the first tapered roller bearing with a predetermined press-fit and an axial end of the adjustable flange in contact with the first plurality of rollers and such that the adjustable flange is axially and linearly slidable relative to the first bearing ring or to the housing supporting the first bearing ring and such that a predetermined force is required to slide the adjustable flange relative to the first bearing ring or to the housing supporting the first bearing ring; and preloading the tapered roller bearing assembly with a predetermined preload force by pressing the first bearing ring and the second bearing ring together, the pressing causing the adjustable flange to slide from a first axial position to a second axial position on the first bearing ring or on the housing while maintaining the predetermined press-fit, a frictional force of the predetermined press-fit creating the predetermined preload on the roller bearing assembly.

12. The method according to claim 11, further comprising, after the preloading, deforming the adjustable flange to fix the adjustable flange to the first bearing ring or to the housing.

13. The method according to claim 12,
wherein the bearing ring or the housing includes a circumferential groove and wherein deforming the adjustable flange comprises forcing a portion of the adjustable flange into the circumferential groove.

14. The method according to claim 11, further comprising, after the preloading, materially bonding the adjustable flange to the first bearing ring or to the housing to fix the adjustable flange to the first bearing ring or to the housing.

15. The method according to claim 11, including hardening the axial end region of the adjustable flange.

16. The method according to claim 11, wherein the axial end region of the adjustable flange includes a wear-resistant coating.

17. The method according to claim 11, wherein the adjustable flange is mounted on the housing.

18. The method according to claim 11, wherein the adjustable flange is mounted on the first bearing ring.

19. The method according to claim 11, wherein pressing the first bearing ring and the second bearing ring together comprises applying a force against the first bearing ring in a first direction and wherein the second axial position is spaced from the first axial position in a second direction opposite the first direction.

* * * * *